June 23, 1925.

L. E. UTTER 1,542,973

TRAVELING ROTATIVE BOLSTER

Filed Feb. 7, 1920

Witness

Inventor
Lee E. Utter
By Erwin Wheeler & Wheeler
Attorneys

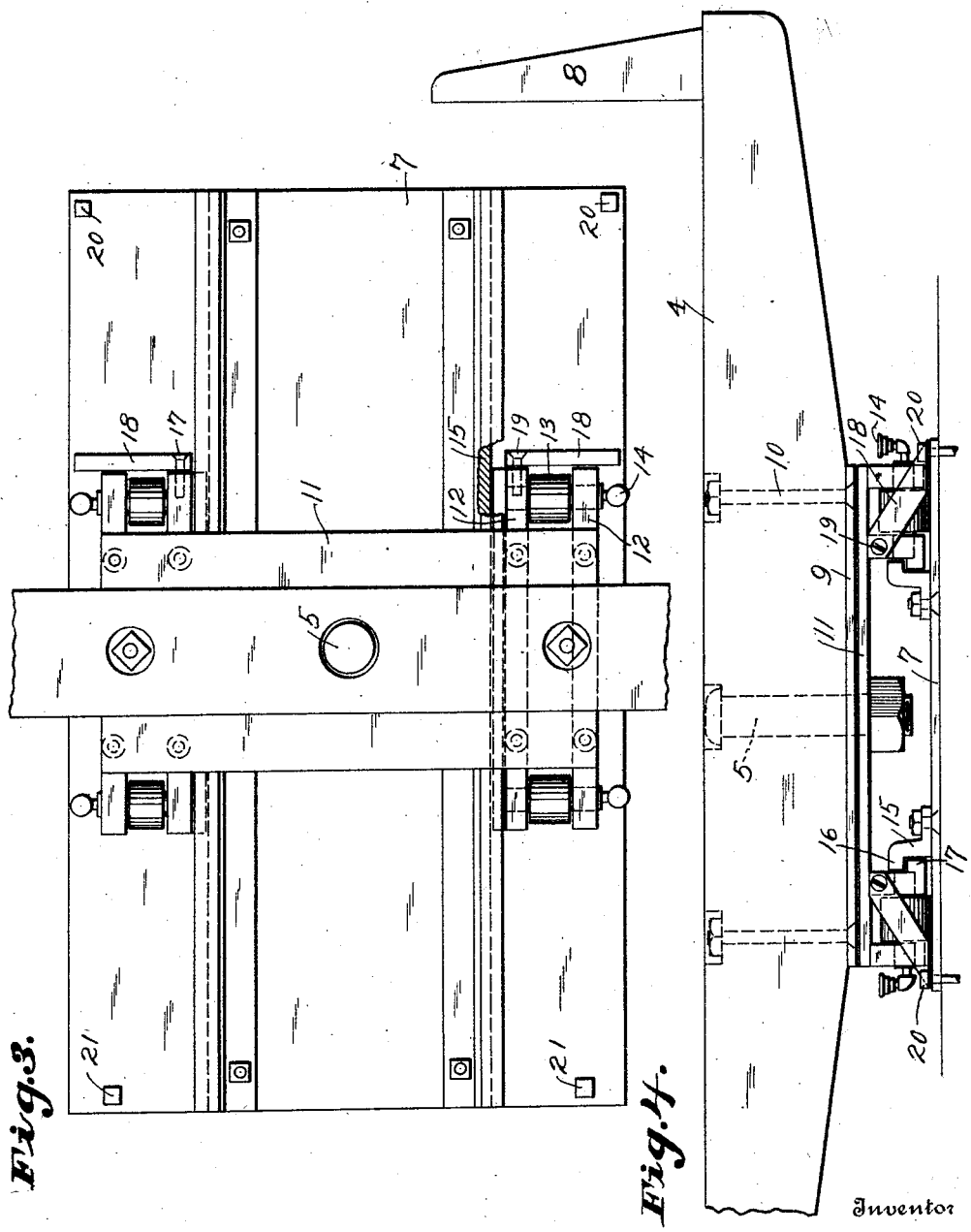

Patented June 23, 1925.

1,542,973

UNITED STATES PATENT OFFICE.

LEE EVERETT UTTER, OF NASHOTAH, WISCONSIN, ASSIGNOR TO THE TRAILER TRUCK COMPANY, OF NASHOTAH, WISCONSIN, A COPARTNERSHIP FIRM.

TRAVELING ROTATIVE BOLSTER.

Application filed February 7, 1920. Serial No. 356,955.

*To all whom it may concern:*

Be it known that I, LEE E. UTTER, a citizen of the United States, residing at Nashotah, county of Waukesha, and State of Wisconsin, have invented new and useful Improvements in Traveling Rotative Bolsters, of which the following is specification.

This invention relates to traveling rotative bolsters.

In trucks provided with trailers difficulty is frequently experienced when turning a corner or when going over ground in which the trailer or the truck occupy relatively different elevations. This difficulty has been mainly due to the shifting of the load upon the bolsters of the truck and trailer as the distance between such bolsters varies under the conditions outlined above. It is to remedy these defects and to provide a construction which will allow for this variation that the present invention is designed.

Objects of the invention are to provide a traveling rotative bolster which will adjust itself relatively to the truck so that the distance between the trailer bolster and the truck bolster will remain substantially constant; to provide a bolster for carrying one end of the load, the other end of the load being carried by the trailer in which relative movement between the load and bolster is prevented; to provide a bolster which may readily pivot and at the same time have a motion of translation; to provide a bolster having the above characteristics which may readily be detached from the truck when desired.

Other objects of this invention are to provide a simple construction of traveling rotative bolster and cooperating truck which may be easily applied to trucks and which will relieve the truck of wear incident to the continual adjustment of the bolster along the body of the truck, and to provide a simple, durable, and rugged structure having a minimum number of parts.

An embodiment of the invention is shown in the accompanying drawing.

Fig. 3 is a partial view of the track and bolster.

Fig. 4 is a partial rear end elevation of the track and bolster.

Figure 1:
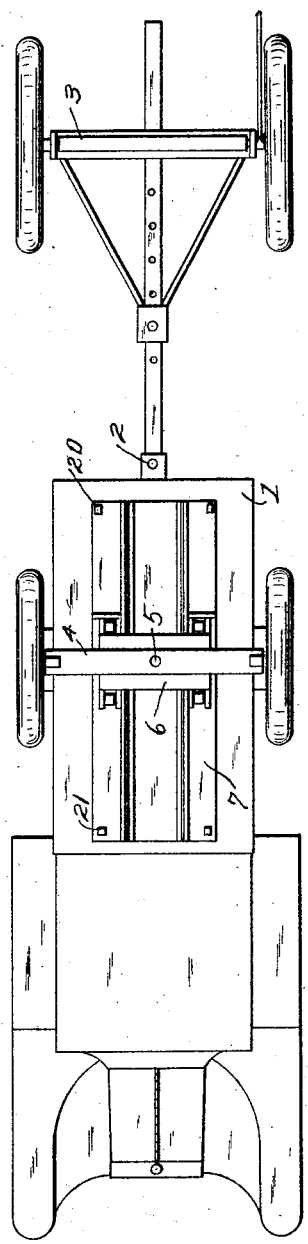
Fig. 1 is a plan view of a trailer truck equipped with the traveling rotative bolster.
Figure 2:
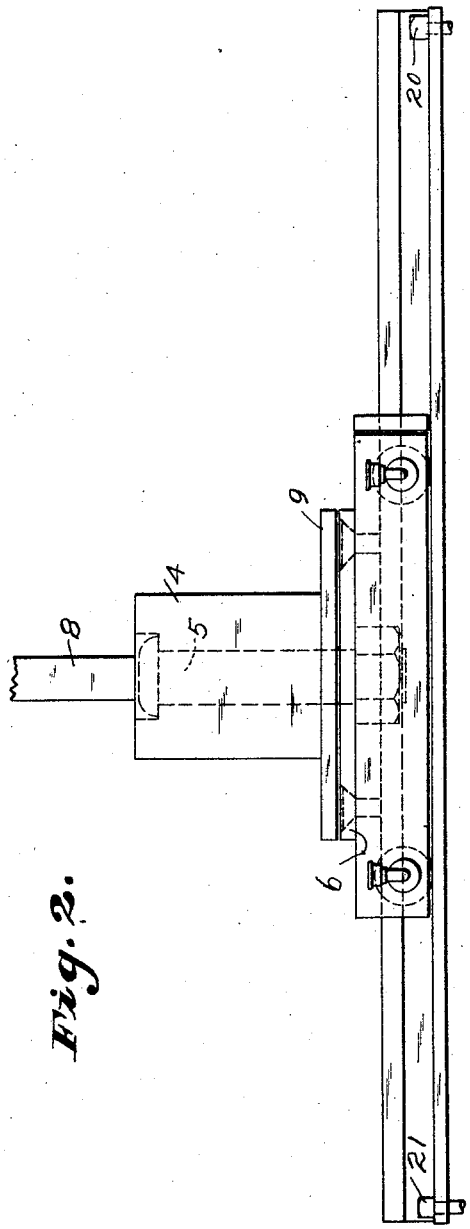
Fig. 2 is a side elevation of the track and bolster upon an enlarged scale.

The truck 1 has pivotally connected at its rear 2, a trailer 3. The trailer is provided with a bolster for carrying one end of a load, such for example, as logs, the other end of such load being carried upon a bolster positioned upon the truck.

The trailer bolster may embody a fluted roller which may be capable of being rotated or of being locked in place. This fluted roller may be provided with a lever for imparting rotary motion to the roller to aid in loading or unloading. The traveling rotative bolster 4 is pivotally mounted, by means of a king pin 5, upon a carriage 6 which is adapted to travel along a track or bed plate 7 when adjusting itself due to varying distances between the trailer and the truck. The bolster 4 is provided with upstanding arms 8 adjacent its ends to retain the load thereon. The lower portion of the bolster is lined with a wearing plate 9 secured thereto by bolts 10. This wearing plate 9 contacts with a plate 11 which forms the upper portion of the carriage 6. This plate 11 carries at each end upon its under side a pair of parallel members 12 which are arranged transversely of the plate 11. At the forward and rear ends rollers 13 are mounted between these parallel members 12, such rollers being adapted to support the weight of the bolster and load thereon, and to roll back and forth along the bed plate or track 7. Oil cups 14 are provided for oiling the axles of these rollers.

In order to prevent sidewise movement of this bolster, upstanding flanges 15 are bolted to the bed plate 7. These flanges extend upwardly and outwardly so as to provide an overhanging portion 16 which projects over an inwardly directed portion 17 formed upon the inner members 12. The flanges prevents transverse motion of the carriage and also prevent such carriage from being lifted bodily upwardly from the track.

It is often desirable to remove the bolster and carriage from the truck. This is provided for by equipping the carriage with two members 18 which are pivotally mounted by a screw 19 to the inner members 12 of the carriage. These arms 18 are adapted to hang downwardly at an angle and slide upon the bed plate 7 and at the rear end of the track they are adapted to contact with the heads 20 of the rear corner bolts which hold the track in place upon the truck. When it is desired to remove this bolster the free ends of the arms 18 are raised so that they will clear the bolt heads 20 and the carriage and bolster are then removed from the rear end of the track. The bolt heads 21 at the forward end of the track are adapted to contact with the outer members 12 of the carriage and prevent such carriage from passing forwardly beyond the limits of the track.

It will thus be seen that a very simple and rugged construction of bolster has been provided which will adjust itself by pivoting about the king pin so as to keep in proper angular relation to the load and will also adjust itself forwardly and rearwardly along the bed plate to accommodate variations in distance between the trailer and the truck. The bed plate or track 7 may be readily removed from, or applied to, an ordinary truck by means of the four or more bolts at the corners and elsewhere thereof.

Obviously other structures may be devised which will embody the invention herein set forth. It is obviously immaterial to this invention whether or not the trailer bolster is pivoted in the usual manner.

I claim—

1. The combination with a truck and trailer, of a bed plate mounted upon the truck, a carriage normally freely movable thereon longitudinally of the truck, means for retaining the carriage upon the bed plate, and a pivotally mounted bolster supported by said carriage.

2. The combination with the frame of a truck, of a traveling rotative bolster including a bed plate, a carriage adapted to travel thereon, and means for releasably retaining said carriage upon said bed plate.

3. The combination with a truck and a trailer, of a bolster upon the trailer, a bed plate upon the truck provided with a pair of tracks, a wheeled carriage adapted for travel upon said bed plate, means carried by the carriage for engaging the tracks to retain said carriage in operative position, means for releasing said carriage from engagement with the tracks, and a bolster pivotally secured to said carriage.

4. The combination with a truck and a trailer, of a bolster mounted upon the trailer, a bed plate upon the truck, a carriage freely movable along said bed plate longitudinally of the truck, means whereby the carriage is retained upon said bed plate to the exclusion of any rotative, tipping, lateral, or vertical movement relative to said plate, a king pin centrally disposed upon said carriage, and a bolster pivoted upon said king pin.

5. The combination with a truck and a trailer, of a bolster mounted upon the trailer, a bed plate mounted upon the truck, a carriage freely movable upon said bed plate longitudinal of the truck, means normally adapted to retain the carriage upright upon the bed plate, and a bolster pivoted to a central portion of the carriage.

6. The combination with a truck and a trailer, of a bolster mounted upon the trailer, a carriage freely movable longitudinally of said truck, and a bolster pivotally secured to said carriage whereby the forward point upon which the load is pivoted will remain constant relative to the load.

7. The combination with a trailer and a vehicle frame provided with ground contacting, supporting devices at longitudinally spaced points whereby to be in longitudinal equilibrium, of a carriage connected with said frame and longitudinally reciprocable with reference thereto, and a bolster pivotally connected with said carriage.

8. The combination with a vehicle frame provided with wheels at longitudinally spaced points whereby to be in longitudinal equilibrium, of means providing a track extending longitudinally of said frame, a carriage reciprocable on said track, and latch devices upon either side of said carriage releasably interlocked with said track means for retaining said carriage thereon while permitting movement as aforesaid.

9. The combination with a vehicle frame provided with wheels at longitudinally spaced intervals, of means supported therefrom providing a track extending longitudinally of said frame approximately to the rear end thereof, a carriage freely reciprocable on said track, and a bolster pivotally mounted on said carriage.

10. The combination with a vehicle including front and rear axles and a frame supported therefrom, of a bed plate carried by said frame and provided with laterally spaced rail portions providing a track extending from adjacent the rear end of the frame to a point forward of said rear axle, a carriage freely reciprocable on said track, and a bolster pivotally mounted on said carriage.

11. The combination with a vehicle including a frame, of rail means supported from said frame and providing a longitudinally extending track having outwardly opening undercut grooves, a carriage reciprocable on said track, and arms pivoted to said carriage and adapted for releasable interlocking engagment with said grooves.

12. The combination with a vehicle including a frame, of rail means supported from said frame and providing a longitudinally extending track having outwardly opening undercut grooves, a carriage reciprocable on said track, arms pivoted to said carriage and adapted for releasable interlocking engagement with said grooves, and a stop adjacent one end of said track in a position to be engaged by one of said arms in one position thereof.

In testimony whereof I affix my signature in the presence of two witnesses.

LEE EVERETT UTTER.

Witnesses:
 VALMA HOWLAND,
 DAVE MURRAY.